United States Patent
Batten

(10) Patent No.: US 12,510,432 B2
(45) Date of Patent: Dec. 30, 2025

(54) METHOD AND DEVICE FOR FINDING THE BALANCE POINT ALONG THE TRANSVERSE AXIS OF A MARINE VESSEL

(71) Applicant: Joseph Keith Batten, Advance, NC (US)

(72) Inventor: Joseph Keith Batten, Advance, NC (US)

( * ) Notice: Subject to any disclaimer, the term of this patent is extended or adjusted under 35 U.S.C. 154(b) by 285 days.

(21) Appl. No.: 18/302,877

(22) Filed: Apr. 19, 2023

(65) Prior Publication Data
US 2024/0353280 A1    Oct. 24, 2024

(51) Int. Cl.
*G01M 1/12* (2006.01)
*B60P 3/10* (2006.01)

(52) U.S. Cl.
CPC ........... *G01M 1/122* (2013.01); *B60P 3/1033* (2013.01)

(58) Field of Classification Search
CPC .................................................. G01M 1/122
See application file for complete search history.

(56) References Cited

U.S. PATENT DOCUMENTS

| | | | | |
|---|---|---|---|---|
| 3,797,594 A | * | 3/1974 | Chaffee | B60D 1/248 177/208 |
| 4,592,694 A | * | 6/1986 | Johnson | B60P 3/1066 280/414.1 |
| 4,997,332 A | * | 3/1991 | Johnson | B60P 3/1066 403/385 |
| 5,634,761 A | * | 6/1997 | Carrick | B60P 3/1066 414/529 |
| 5,775,868 A | * | 7/1998 | Mann | B60P 1/16 414/475 |
| 7,960,659 B2 | * | 6/2011 | Cleary | G01G 19/08 116/28 R |
| 9,862,297 B2 | * | 1/2018 | Dagenais | B60P 1/433 |
| 10,538,191 B2 | * | 1/2020 | Hooper | B60P 3/10 |
| 2021/0309194 A1 | * | 10/2021 | Thomas | B60D 1/26 |
| 2024/0351668 A1 | * | 10/2024 | Batten | B63C 5/02 |
| 2024/0353280 A1 | * | 10/2024 | Batten | G01M 1/122 |

* cited by examiner

*Primary Examiner* — Michael A Berns
(74) *Attorney, Agent, or Firm* — Russell D. Nugent; Comprising IP

(57) ABSTRACT

A device for finding the center of mass for a marine or similar vessel that includes a cradle seated on a fulcrum that can hold the vessel. The frame upon which the cradle is positioned is shaped to allow the front and back of the cradle to tip upwards and downwards much like a seesaw depending on how the vessel is balanced in the cradle. The device can be used to locate the center of mass or gravity of a vessel or to determine the position of a vessel such that it applies a predetermined amount of weight to the front or back end of a trailer or other supporting device. Scales can be located at either end of the device to calculate the amount of weight exerted by the vessel at either end of the cradle.

8 Claims, 5 Drawing Sheets

Figure 1:
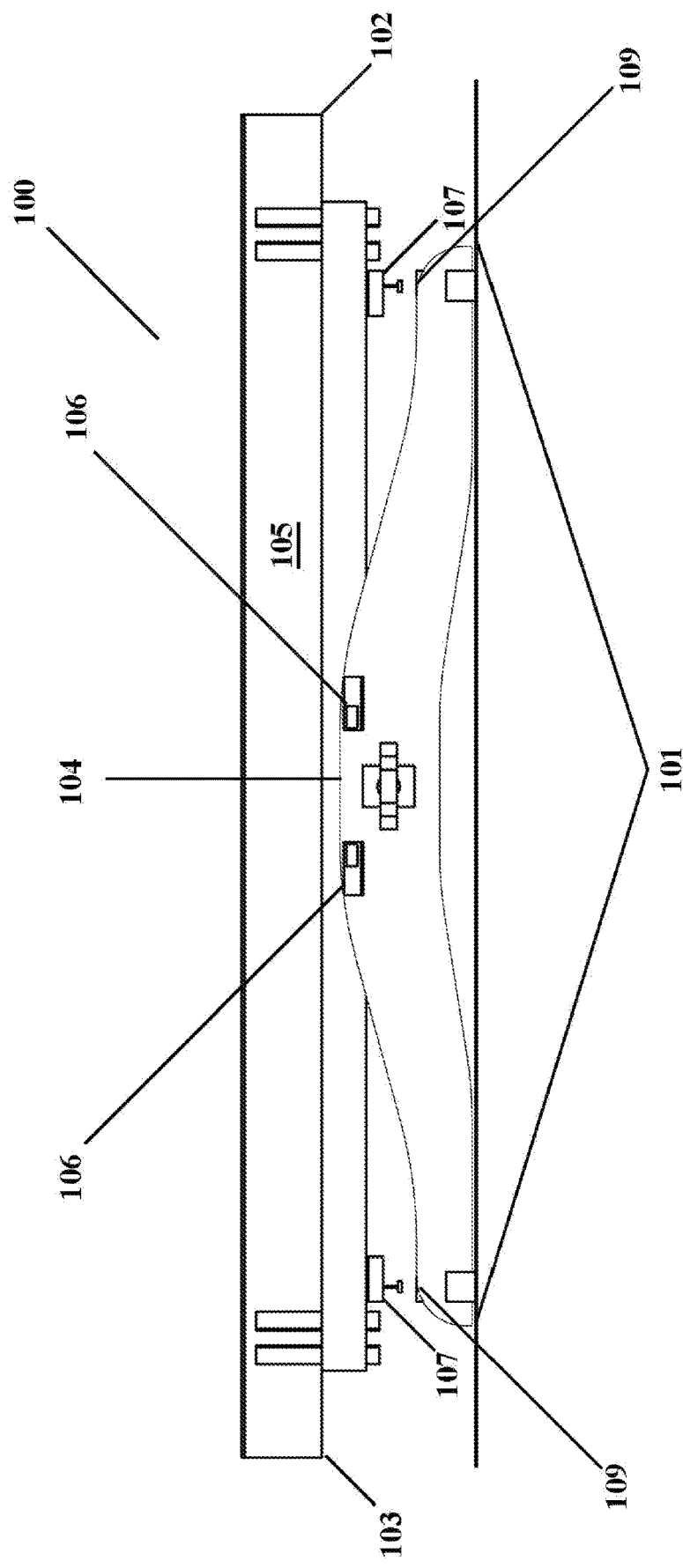

METHOD AND DEVICE FOR FINDING THE BALANCE POINT ALONG THE TRANSVERSE AXIS OF A MARINE VESSEL

BACKGROUND OF THE INVENTION

(a) Field of the Invention

The present invention is in the technical field of marine equipment and accessories. More particularly, the present disclosure relates to a device that can be used to locate the center of gravity of a boat or other marine vessel.

(b) Background Art

Boat storage is a problem common to every boat owner in the United States. The vast majority of boat owners do not live on the water or have a private water access. As a result a very large percentage of the boats owned by Americans are stored on dry land. This of course necessitates the boat be transported to water in order for the boat owner to enjoy their boat. Transportation entails its own problems.

In order to safely transport a marine vessel on a trailer, the vessel has to be properly positioned on its trailer. If the vessel is not properly positioned on the trailer, then there is a very high chance that a portion of boat will either not be supported correctly or be carrying more than its fair share of the weight. If the boat is not positioned properly, it can rock back-and-forth during transport causing damage to the boat. In addition, if the vessel is not properly positioned then the vessel may move on the trailer during transport. This can cause damage to the boat as well as a motor vehicle accident. Moreover, if a portion of the hull of the boat is carrying more weight than it should, then the whole of the boat can wind up becoming dented or abraded.

As a result, boat owners commonly find that they have to engage in a fair amount of work in order to find the center of gravity of their boat so they can properly place it on the trailer. The manufacturer or an engineer can take an educated guess as to where the center of gravity is on a vessel, but boat owners benefit greatly from increased precision in this context. A typical method for finding the center of gravity of a boat involves (1) weighing each side of the boat while it is level, (2) measuring the exact distance from the bow to each weight measurement point (3) multiplying each weight by the distance from the bow, (4) adding the two numbers and (5) dividing the total by the sum of the two weights. Other boat owners resort to the use of a plumb bob and pendulum in order to locate the center of gravity of their boat. However current boat owners determine the center of gravity of their boat, they are generally engaged in measuring or weighing portions of the boat and using the data to perform mathematical calculations. This can be a difficult and unpleasant process for some boat owners and errors in the calculations can lead to boat damage and/or accidents during transportation.

Another, related issue, is the need to properly weigh down the tongue of the trailer during transportation. If there is not enough weight on the tongue of the trailer, then the trailer may sway back and forth when being moved, again leading to accidents and damage. The extra weight on the back of the trailer can swerve back and forth pulling on the towing vehicle at the same time. Conversely, if there is too much weight on the tongue of the trailer when the vessel is being transported, then the rear tries of the vehicle can be overloaded and negatively affect the handling of the vehicle.

As a result, there exists in the field and need for a device and method that makes it easy and convenient to accurately locate the center of gravity of a marine vessel or boat so they can be properly centered on a trailer for transport. Moreover, there is a need for a device and method of accurately determining how much weight has been placed on the tongue of a trailer.

A goal of the present disclosure is to provide such a method and device that allows a user, especially an inexperienced boat owner, an easy, convenient and more straightforward means of accurately calculating the exact center of gravity of the boat without the need for taking a lot of measurements and performing mathematical calculations. Another goal of the present disclosure is to provide a user with a simple and convenient way to calculate the amount of weight that is on the tongue of their trailer when the boat is in different positions on a trailer.

BRIEF SUMMARY OF THE INVENTION

The present invention is a device and method of using same that allows a person to easily and accurately calculate the center of gravity of a marine vessel. The device includes a cradle capable of holding the weight of a marine vessel. Preferred embodiments and the inventors anticipated best mode of the device include a cradle that has two or more boat bunks which are elongated structures arranged side by side or substantially parallel to each other onto which a boat or other marine vessel can be placed. The boat bunks extend at least part of the way from between the back of the cradle and the front of the cradle. The cradle also features a plurality of rails that extend horizontally from the right side of the cradle to the left side of the cradle. Preferred embodiments of the device include boat bunks that are adjustable, i.e. they can be manipulated to move toward and away from each other by sliding along one or more rails. This arrangement allows the user to adjust the width of the cradle such that it can accommodate different widths of marine vessels.

The cradle is supported by a subframe. The subframe has a front and a back that extend downward towards the ground in comparison to the middle portion which is raised. The middle portion features a fulcrum. Features in this disclosure means has, attached to, integrated into, on top of, inside, positioned proximate to or included within. The cradle is positioned on the fulcrum. When the vessel is balanced, the vessel rests on the fulcrum and the cradle is level, i.e. neither the front nor the back of the cradle tilt downward. When the cradle is evenly balanced on each side, the boat bunks/cradle are level with the ground. When a vessel or any other object is placed in the cradle, the weight of that object will cause the cradle to rock toward the front or back of the cradle/subframe like a seesaw if the vessel is not properly centered over the fulcrum. The user can adjust the position of the vessel or boat on the cradle until it is evenly balanced on either side and the cradle is level. Some embodiments of the cradle include one or more levels, i.e. sealed transparent tubes oriented horizontally or vertically on the cradle to assist the user in figuring out what the cradle is completely level.

Still other embodiments and the inventor's anticipated best mode of the device include one or more scales featured by the device. Preferred embodiments include at least one scale at either end of the cradle. Each scale is positioned such that it will contact a location on the subframe when the end of the cradle featuring that scale carries enough weight to make that end move downward. The scale contacts this portion of the subframe causing pressure to be applied to the scale. The scale can thus be used to calculate how much weight is being applied to the subframe by either the front and/or back of the cradle. The scales can be connected to an electronic readout that is visible on the outside of the cradle for ease of use. If the boat's center of gravity is not over the fulcrum, then one end of the boat will tip downward applying weight/pressure to one of the scales. In this manner, the user can balance their boat such that the weight of the vessel is distributed to their liking.

BRIEF DESCRIPTION OF THE SEVERAL VIEWS OF THE DRAWING(S)

Figure 2:
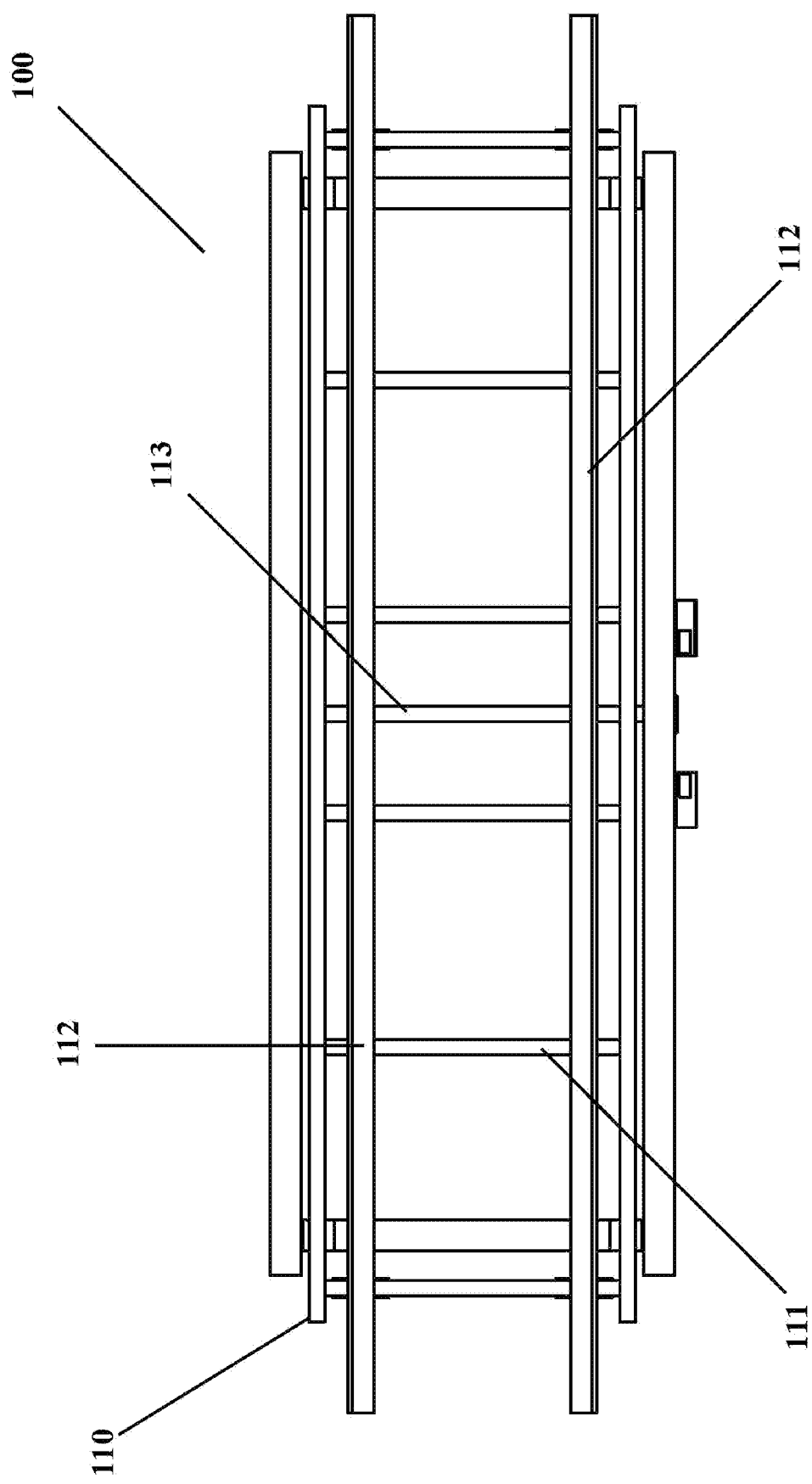
Figure 3:
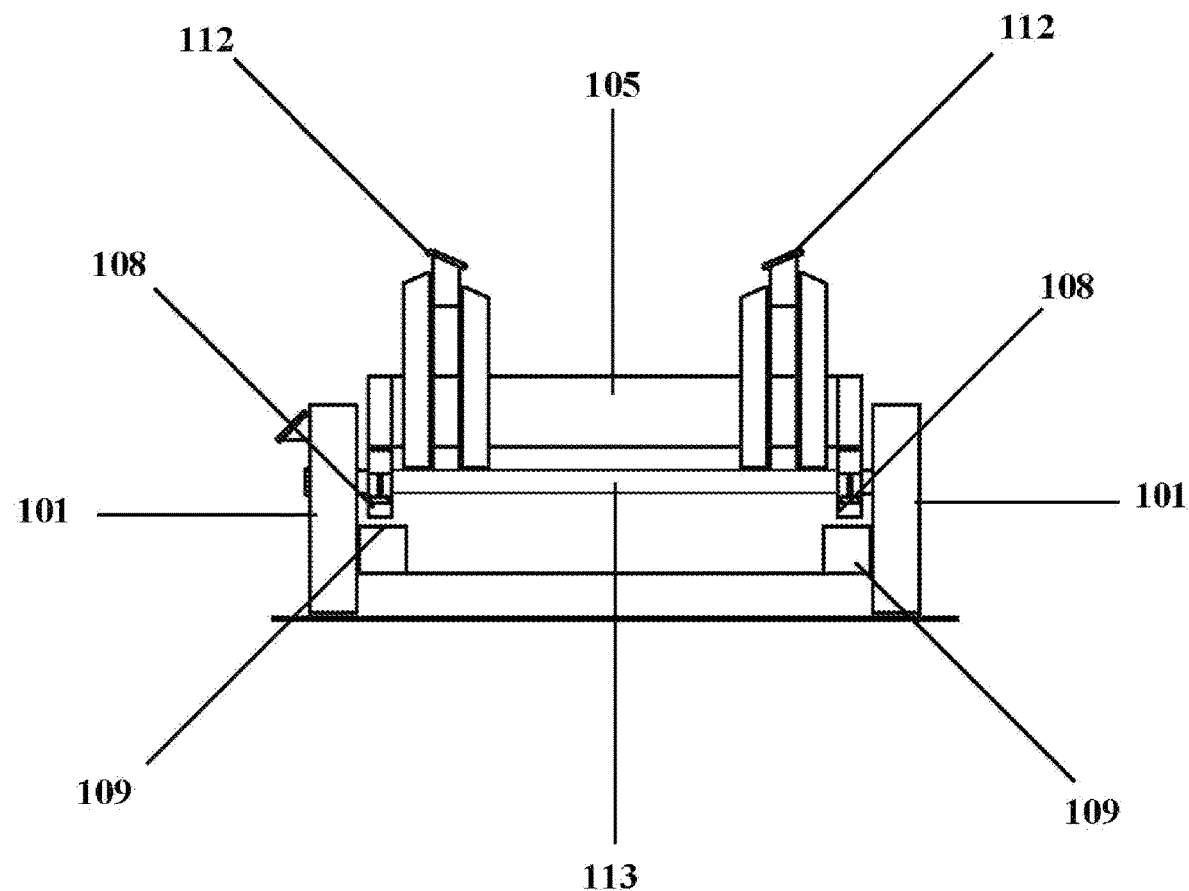
Figure 4:
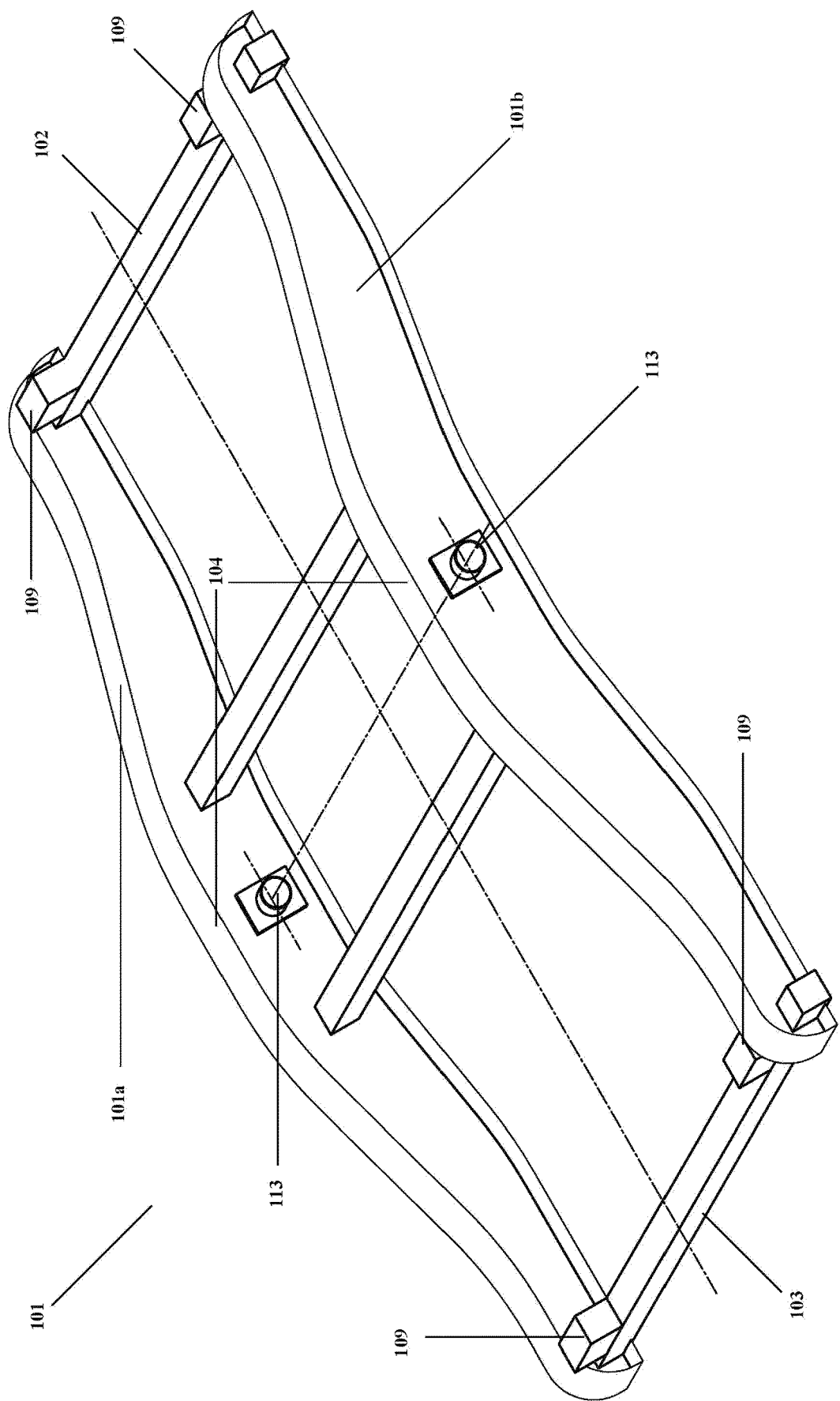
Figure 5:
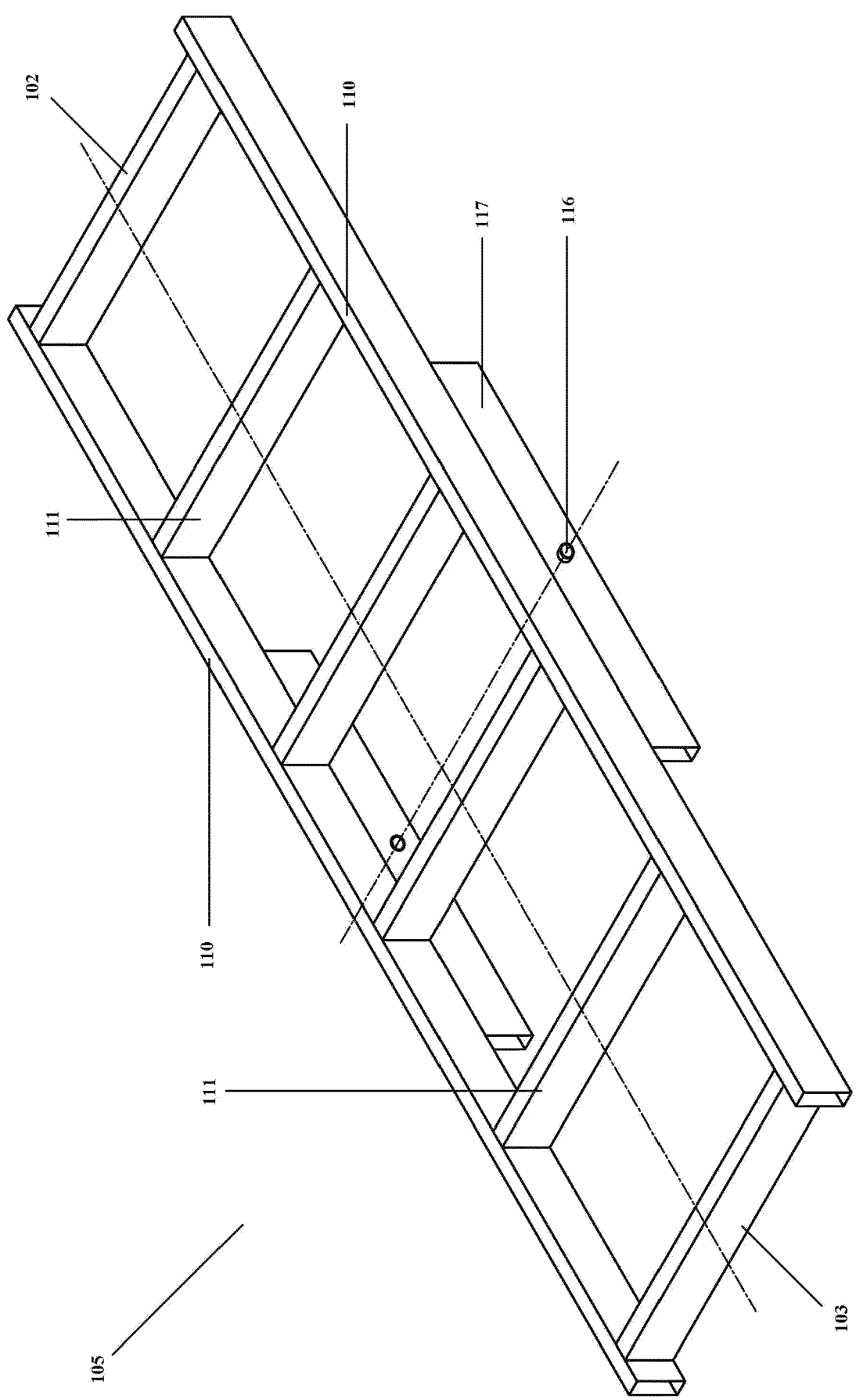

FIG. 1 is a side plan view of an embodiment of the device;
FIG. 2 is a top plan view thereof;
FIG. 3 is a front plan view thereof;
FIG. 4 is a top plan view of the device with the cradle removed; and
FIG. 5 is a perspective view of the cradle removed from the rest of the device.

DETAILED DESCRIPTION OF THE INVENTION

Referring now to the invention in more detail, FIG. 1 shows a side view of the device 100. The device 100 includes a subframe 101 having a first end or front end 102 and a second end of back end 103 with a raised middle portion 104 in between the two. First end, front end, back end and second end are arbitrary designations for the purposes of illustration and are not related to the functioning of the device. The raised middle portion 104 of the subframe gives the cradle 105 of the device 100 room to tilt upwards and downwards, toward and away from the front end 102 and the back end 103 of the subframe 101. The subframe can also feature one or more electronic readouts 106 operably connected to the scales 107 on the cradle 105.

FIG. 1 also shows the cradle 105 that is positioned on top of the subframe 101. Preferred embodiments and the inventor's anticipated best mode include one or more scales 107 at either end of the cradle 105. One or more scales 107 are positioned on the underside of the cradle proximate to the front 102 and the rear 103 of the cradle 105. The scales 107 are each positioned so that a portion of the scale 107 can contact a location 109 on the subframe 101 beneath it when that end of the cradle 105 tips downward toward the subframe 101. When that portion of the scale 107 contacts the subframe 101 the scale 107 displays the weight that is being applied to that portion of the cradle/subframe based on the pressure applied to the scale 107. Other versions of the device 100 can include scales 107 positioned on the subframe 101 itself such that the scale 107 contacts a location on the cradle 105 when the front 102 or rear 103 of the cradle 105 moves downward. FIG. 1 also shows the fulcrum 113 which is a bar-shaped structure that extends from one side of the subframe 101 to the other and in this embodiment, traverses the outside surface of each side of both the subframe 101 and the cradle 105. In this embodiment, the fulcrum 113 extends through the cradle 105 similar to an axle allowing the cradle to tip towards and away from the front end 102 and the back end 103 of the subframe 101.

FIG. 2 shows a top-down view of the same device 100. The cradle 105 is made up of a plurality of rails 110 that extend horizontally form a first or right side 105a of the cradle 105 to a second or left side 105b of the cradle 105. These rails 110 form a first side 105a and a second side 105b of the cradle 105. The rails 110 are laterally spaced apart and substantially parallel to each other. Substantially parallel or perpendicular in this disclosure means within 10 degrees of being perfectly parallel or perpendicular. The cradle also has a plurality of crossbars 111 that are attached or integrated into the first 105a and second side 105b of the cradle 105, i.e. each crossbar 111 extends from the rail 110 that forms the first side 105a of the cradle 105 to another rail 100 that forms the second side 105b of the cradle 105 forming a ladder-like frame. Attached to the cradle 105 is at least one if not a plurality of boat bunks 112. While in theory a single boat bunk 112 may be used here, a vessel is held more stably in the cradle 105 when more than one boat bunk 112 is present. Each boat bunk 112 extends at least part of the distance between the front 102 of the cradle 105 and the back 103 of the cradle 105. FIG. 2 also shows the fulcrum 113 upon which the cradle 105 is positioned and balanced.

FIG. 3 is a front view of the same device 100. From this angle, the Figure shows the subframe 101 featuring a fulcrum 113 upon which the cradle 105 rests. As discussed above, the boat bunks 112 are slidably connected to some of the rails 110 or crossbars 111 of the ladder-like frame that makes up a portion of the cradle 105. The boat bunks 112 are slidably mounted to the cradle 105, either one or more rails 110 or one or more crossbars 111, with brackets and bolts or other fasteners that can be loosened and moved along the length of the crossbars 111 and/or rails 110 and then retightened to hold the boat bunks 112 in place firmly. In this manner, the distance between the boat bunks 112 can be adjusted to accommodate different sizes of vessels.

FIG. 3 also shows that the subframe 101 includes two portions or locations 109 that are flat. It is these flat locations 109 that the scales 107 or the scales' sensors 108 contact when the cradle 105 is loaded with enough weight to make the front end 102 or back end 103 of the cradle 105 dip downward enough to apply pressure to the scales 107 or their sensors 108 thereby allowing the user to determine how much weight is being applied to the subframe 101 at either end of the cradle 105. As can be seen from FIG. 3, some embodiments of the device include two scale sensors 108 on each of the front end 102 and the back end 103 of the cradle 105. A skilled artisan can appreciate that there are a number of different configurations that allow the scales and their sensors to be positioned in different ways on the device.

FIG. 4 shows top-perspective view of the subframe 101 removed from the rest of the device 100. The subframe 101 has two sides-a first side 101a and a second side 101b. In addition, the subframe 101 also has a first end or front end 102 and a second end or back end 103 corresponding to the front end 102 and back end 103 of the cradle 105. Between the front end 102 and back end 103 is a raised middle portion 104 of the subframe 101. It is on this middle portion 104 that the cradle (not shown) rests. FIG. 4 also shows a plurality of flattened portions of the subframe that are the locations 109 at which the scale 107 or the scale sensor 108 contacts the subframe 101 The subframe 101 also includes a fulcrum 113. In some embodiments, there is a single fulcrum 113 that passes completely through or traverses the first side 101a of the subframe 101 and extends to and passes through or traverses the second side 101b of the subframe 101. In the embodiment depicted in FIG. 4 however, the fulcrum 113 is actually two separate and distinct structures that are integrated into each side 101a and 101b of the subframe 101. In this manner each portion of the fulcrum 113 protrudes from an inner surface 101c of the subframe to contact a corresponding portion of the cradle 105.

FIG. 5 shows a side perspective view of the cradle 105 removed from the rest of the device 100. The cradle 105 has two sides made of rails 110 connected by a plurality of crossbars 111. In addition, each of the rails 110 features an opening 116 through which the fulcrum (not shown) passes. As discussed above, the fulcrum 113 includes, in preferred embodiments, two structures integrated into the sides 101*a* and 101*b* of the subframe 101. Each structure can be thought of as a separate fulcrum 113 meaning preferred embodiments of the device have a first fulcrum 113 and a second fulcrum 113. The cradle has corresponding openings 116 on or in the rails 110 on each side of the cradle 105 into which the two portions of the fulcrum 113 or the two fulcrums insert and in doing so, the cradle 105 is suspended over the subframe 101 by the fulcrum 113. Preferred embodiments of the cradle also feature an extended portion 117 that extends downward form the cradle towards the subframe 101 that accommodates the fulcrum 113 and thereby provides more room for the cradle to tip up and down.

The method of using the device is relatively straightforward. The user places a marine vessel or other object (not shown) onto the boat bunks 112 that are attached to the cradle 105. The user then allows the cradle 105 to come to rest on the fulcrum. To find the center of gravity of the vessel (not shown) the user moves the vessel toward or away from the front end 102 and the back end 103 of the cradle 105 until the cradle 105 is level when it comes to rest. The user has at that point has found the center of gravity of the vessel and can mark or measure its location for future reference. If the user would like to balance the vessel on their trailer such that a certain amount of weight is applied to the tongue of their trailer, the user then further alters the position of the boat, i.e. pulls it forward in the cradle 105, until the front 102 of the cradle 105 dips downward causing the scale's sensors 108 on the front end 102 of the cradle 105 to contact the corresponding flattened location 109 on the subframe 101. The scales 107 are operably connected to readouts 106 on the subframe 101 so the user can easily see how much weight is applied to the front 102 or back 103 of the cradle 105.

The various parts of the device can be constructed of any durable materials strong enough to support the weight of the cradle and a marine vessel. Preferred embodiments of the device are made out of steel with the subframe being made of modified I-beams. The boat bunks can be made of metal, wood, plastic or any combination thereof. The scales are commercially available and can feature a protrusion or extension that attaches to the frame of the scale and applies pressure to it when it is pressed.

The advantages of the present invention include, without limitation, the ability to locate the center of gravity of a marine vessel or other object easily and without crunching numbers. Moreover, the device can be used to measure the amount of weight a particular vessel applies to a portion of a trailer, for example the tongue. The device can be transported to a convenient location, i.e. it can be brought to the vessel rather than having it bring the vessel to the device. Preferred embodiments of the device include one or more pneumatic motors or lifters (not shown) that can raise and lower the device. The device can also be placed on wheels to make it more easily moved.

Reference throughout the specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout the specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

It is understood that the above-described embodiments are only illustrative of the application of the principles of the present invention. The present invention may be embodied in other specific forms without departing from its spirit or essential characteristics. The described embodiment, including the best mode, is to be considered in all respects only as illustrative and not restrictive. The scope of the invention is, therefore, indicated by the appended claims, if any, in conjunction with the foregoing description.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

I claim:

1. A device for determining how to position a marine vessel on a trailer comprising:
   a subframe having a first end, a second end, a raised portion between the first end and the second end and at least one fulcrum;
   a cradle supported by the subframe; said cradle having a plurality of rails that form a first side and a second side of the cradle; wherein the at least one fulcrum passes through the first side and the second side of the cradle;
   a plurality of boat bunks attached to the cradle and extending at least partially from a front of the cradle to a back of the cradle; and
   a first scale located proximate to a portion of the cradle that is positioned to contact a first location on the subframe when the portion of the cradle is tilted downward.

2. The device of claim 1 wherein the cradle comprises:
   a plurality of crossbars attached to the first side of the cradle and extending horizontally from the first side of the cradle to attach to the second side of the cradle.

3. The device of claim 2 wherein the plurality of boat bunks are slidably attached to the plurality of crossbars such that the plurality of boat bunks can slide toward and away from the first side of the cradle and the second side of the cradle.

4. The device of claim 1 further comprising a second scale located proximate to a back of the cradle that is positioned to contact a second location on the subframe when the back of the cradle is tilted downward.

5. A device for determining a balance point of a marine vessel comprising:

a subframe having a first end, a second end and a first fulcrum attached to a first side of the subframe and a second fulcrum attached to a second side of the subframe;

a cradle having a plurality of rails that form a first side and a second side of the cradle;

an extended portion that features an opening on each of the first side and second side of the cradle;

a plurality of crossbars attached to the first side of the cradle and extending horizontally from the first side of the cradle to attach to the second side of the cradle; and at least one boat bunk slidably attached to the cradle and extending at least partially from a front of the cradle to a back of the cradle; and at least one scale positioned on a portion of the cradle such that when the portion of the cradle moves downward toward the subframe, a sensor on the at least one scale contacts a location on the subframe.

6. The device of claim 5 wherein the first fulcrum is inserted into the opening on the first side of the cradle and the second fulcrum is inserted into the second side of the cradle thereby supporting the weight of the cradle on the subframe.

7. The device of claim 5, wherein the at least one scale is positioned proximate to the front of the cradle such that when the front of the cradle moves downward toward the subframe, a sensor on the at least one scale contacts a location on the subframe.

8. The device of claim 5, further comprising at least one scale positioned proximate to the back of the cradle such that when the back of the cradle moves downward toward the subframe, a sensor on the at least one scale contacts a location on the subframe.

* * * * *